US008923501B2

(12) United States Patent
McCormack et al.

(10) Patent No.: US 8,923,501 B2
(45) Date of Patent: Dec. 30, 2014

(54) METHOD AND SYSTEM FOR MANAGING CONTACTS IN A CONTACT CENTER

(75) Inventors: Tony McCormack, Galway (IE); Li Fang, Boulder, CO (US); Divakar Kumar Ray, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 96 days.

(21) Appl. No.: 13/193,738

(22) Filed: Jul. 29, 2011

(65) Prior Publication Data
US 2013/0030854 A1 Jan. 31, 2013

(51) Int. Cl.
*H04M 3/00* (2006.01)
*G06Q 30/00* (2012.01)
*H04M 3/523* (2006.01)
*H04L 12/58* (2006.01)

(52) U.S. Cl.
CPC .............. *G06Q 30/01* (2013.01); *H04M 3/523* (2013.01); *H04L 51/28* (2013.01); *H04L 51/02* (2013.01); *H04L 51/046* (2013.01)
USPC ................. 379/265.01; 379/265.06; 709/224; 705/7.39

(58) Field of Classification Search
None
See application file for complete search history.

(56) References Cited

U.S. PATENT DOCUMENTS

| | | | |
|---|---|---|---|
| 6,853,966 B2 * | 2/2005 | Bushey et al. ................... 703/13 |
| 7,085,367 B1 * | 8/2006 | Lang ......................... 379/265.06 |
| 7,711,104 B1 * | 5/2010 | Flockhart et al. ......... 379/265.03 |
| 7,729,490 B2 * | 6/2010 | Hemm et al. ............ 379/265.02 |
| 7,734,032 B1 * | 6/2010 | Kiefhaber et al. ........ 379/265.01 |
| 7,936,867 B1 * | 5/2011 | Hill et al. .................. 379/265.12 |
| 7,949,121 B1 * | 5/2011 | Flockhart et al. ......... 379/265.02 |
| 8,200,527 B1 * | 6/2012 | Thompson et al. ........... 705/7.39 |
| 8,234,141 B1 * | 7/2012 | Flockhart et al. ............ 705/7.13 |
| 8,238,541 B1 * | 8/2012 | Kalavar ..................... 379/265.06 |
| 8,295,471 B2 * | 10/2012 | Spottiswoode et al. . 379/265.11 |
| 8,363,817 B2 * | 1/2013 | McCormack et al. ... 379/265.12 |
| 8,457,300 B2 * | 6/2013 | Hemm et al. ............. 379/266.01 |
| 8,484,042 B2 * | 7/2013 | Cloran ........................... 705/1.1 |
| 8,634,541 B2 * | 1/2014 | Flockhart et al. ......... 379/265.12 |
| 2004/0193475 A1 * | 9/2004 | Hemm et al. ..................... 705/9 |
| 2005/0002502 A1 * | 1/2005 | Cloran ........................ 379/88.18 |
| 2005/0182672 A1 * | 8/2005 | Hemm et al. ..................... 705/9 |
| 2006/0080107 A1 * | 4/2006 | Hill et al. ....................... 704/275 |
| 2007/0198368 A1 * | 8/2007 | Kannan et al. .................. 705/26 |
| 2008/0208644 A1 * | 8/2008 | Gray et al. ......................... 705/7 |
| 2011/0029658 A1 * | 2/2011 | Werth et al. .................... 709/224 |
| 2011/0099182 A1 * | 4/2011 | Hayner et al. ................. 707/754 |
| 2011/0251874 A1 * | 10/2011 | Banthia et al. ............... 705/7.31 |

OTHER PUBLICATIONS

Coles, Scott. "A Guide for Ensuring Service Quality in IP Voice Networks."Avaya, Inc (2002): 1-17.*

(Continued)

*Primary Examiner* — Gurkanwaljit Singh
(74) *Attorney, Agent, or Firm* — Maldjian Law Group LLC; John Maldjian; Alexander D. Walter

(57) ABSTRACT

A computer-implemented method of handling contacts at a contact center. The method includes the steps of identifying a characteristic associated with a contact received at the contact center, and labeling a contact entity representing the contact with a label identifying the characteristic. In response to receipt of a request from an agent of the contact center to handle the contact based on the label of the contact entity, the contact is assigned to the agent and in response to the agent successfully handling the contact, an agent record associated with the agent, is updated to indicate a proficiency in handling contacts associated with the characteristic.

28 Claims, 4 Drawing Sheets

(56) References Cited

OTHER PUBLICATIONS

Khanvilkar, Shashank, and Ashfaq Khokhar. "Virtual private networks: an overview with performance evaluation." Communications Magazine, IEEE 42.10 (2004): 146-154.*

Busemann, Stephan, Sven Schmeier, and Roman G. Arens. "Message classification in the call center." Proceedings of the sixth conference on Applied natural language processing. Association for Computational Linguistics, 2000.*

Mishne, Gilad, et al. "Automatic analysis of call-center conversations."Proceedings of the 14th ACM international conference on Information and knowledge management. ACM, 2005.*

Lee, Chin-Hui, et al. "On natural language call routing." Speech Communication31.4 (2000): 309-320.*

Paprzycki, Marcin, et al. "Data mining approach for analyzing call center performance." Innovations in Applied Artificial Intelligence. Springer Berlin Heidelberg, 2004. 1092-1101.*

\* cited by examiner

METHOD AND SYSTEM FOR MANAGING CONTACTS IN A CONTACT CENTER

BACKGROUND

1. Field of the Invention

The present invention relates to a methods and systems for managing contacts in a contact center.

2. Description of Related Art

Contact centers are commonly used to allow an enterprise or business to efficiently handle customer enquiries, complaints and support, and to allow an enterprise to make contact with existing or potential customers.

Traditionally, customers have interacted with contact centers by initiating contact with the intention of communicating with an agent capable of dealing with a specific query. As illustrated in FIG. 1, a conventional contact centre, generally indicated at 10, is connected both to the Internet 12 and to the public switched telephone network (PSTN) 14. Traditional telephony (including voice) communications can of course be via Internet Protocol (IP) based communications, using protocols such as SIP. Customers 16 can contact the contact center 10 by connecting to the Internet 12 via a personal computer running appropriate communications software or a phone 16. Phone 16 may of course be an Internet-enabled phone, or it may connect via the PSTN. In particular, customers can connect to an email server 18, a web server 20 or a private branch exchange (PBX) 22 equipped with a voice over Internet protocol (VOIP) gateway and/or a video interface.

The contact center 10 has a local area network (LAN) 24, which connects each of the servers 18, 20, 22 with a media server/conference bridge 26. A plurality of agents 28 (one of whom is indicated in FIG. 1) are also connected using an agent workstation which is a personal computer equipped with agent client software providing multimedia capabilities to the contact center LAN. It is to be understood that agents may be connected also to the contact center via the Internet 12 or via a wide area network, and they can also be connected over the PSTN. Such distributed contact center architectures are well known and the present invention is not limited to any particular architecture of contact center.

Customers contact the contact center, for example, by making a voice or video call over the Internet or the PSTN, which is handled by the PBX 22. Customers can also make contact by a chat session hosted on the web server 20. In addition to such "live" contact sessions, the contact center 10 can also receive submissions from web forms hosted on the web server 20, or from a customer email which is received at the email server 18.

A typical contact center, such as the one indicated in FIG. 1, will further comprise a management component such as a contact center server 30 for controlling the operation of the email server 18, web server 20 and PBX 22, to direct contacts to suitable agents. When a contact is received at the respective server, 18, 20, or 22, the contact center server 30 is notified of the existence of a new contact and creates a contact record (not shown), which records details of the received contact such as the time it was received, its source, any customer details which can be deduced based on the source (e.g. the caller line ID or an IP address might be used to reference a customer profile in a database), and the nature of the contact (e.g. customers may have access to a first communication channel for sales or a second communication channel for technical support, etc.).

Thereafter, the contacts are analysed and may be handled automatically as far as possible, for example, by using automated response systems and interactive voice response systems, (IVRs).

For example, in the case that a contact received at the contact center 10 is a voice or video call, the contact is subjected to various recorded announcements and the customer is requested to provide information in response to such announcements in order to either dispose of the contact (if automated handling can satisfy all of the needs of that particular customer) or to determine requirements for handling the contact. The information gleaned from this session is then passed back to the contact center server 30 to update the contact record (not shown).

Alternatively, if the contact is an another type of "live" session, such as an instant messaging (IM) contact, or a type of "non-live" session, such as an email contact or a web form contact, the contact center server 30 will analyse the contact automatically as far as possible and storing any information gleaned therefrom in the contact record.

Thus, information gleaned from the contact in its initial stages, for example, from menu choices made in an IVR session, or from the "subject" or "To" field of an email, or from analysis of the content of the transaction is stored in the contact record (not shown) and utilised by the contact center server 30 in making contact handling decisions. To this end, the contact center server 30 comprises a contact manager 32, an agent manager 34, and a work assignment engine 36 comprising a queuing function 36, the functions of each of which are typically implemented by appropriate software elements forming part of an overall contact center management application.

In particular, the contact manager 32 is arranged to create, monitor and update the contact record (not shown). The agent manager 34 maintains an agent record (not shown) for each agent of the contact center, which identifies skillsets the agent is qualified to handle and a status of the agent.

The contact manager 32, the agent manager 34, and queuing function 36 interact with one another to queue the incoming contacts to one or more suitable agents, by placing the contacts in one or more skillset queues. It will be appreciated that while a contact is being is queued, unless an agent is available immediately to deal with the contact, the contact will typically be provided with a media feed. When a suitable agent becomes available to deal with the queued contact, the email server, 18, web server 20, or PBX 22, as appropriate, is directed to transfer the contact to the agent for processing.

The skillset queues are serviced by the agents 28 depending on their associated skillsets. In general, an agent record (not shown), which identifies skillset(s) associated with the agent, is manually created, maintained and updated, for each agent 28 of the contact center 10, for example, by a contact center supervisor. The agent manager 32 is arranged to consult the agent record (not shown) to identify a suitable agent to whom a contact should be assigned. In this way, the selected agent is equipped with the necessary skillset to address the customer's needs, without having to redirect the contact within the contact center until it happens to be assigned to an agent having the necessary skillset.

However, it will be appreciated that in large or expanding contact centers, the manual creation, maintaining and updating of agent's records becomes cumbersome, leading to processing delays, and thereby affecting the efficiency of the contact center in handling contacts. In addition, the manual creation, maintenance and updating of agent records introduces the potential for human error.

The manner of managing contact centers as described also involves further problems hindering the efficient processing of contacts. In most modern contact centers, agents are "multiplicity agents" or agents equipped with the necessary functionality to handle various multimedia contacts at any one time. However, these multiplicity contact centers place an increased burden on the contact center server 30 to appropriately queue contacts received at the contact center 10.

For example, a number of email contacts, an IM contact and a voice contact may currently be assigned to an agent 28. If the agent were to complete the processing of an email contact, they may be available to receive the next queued email contact, but may nonetheless be unavailable to receive the next queued voice contact. Thus, the contact center server 30 must not only match a given contact with a suitable agent, based on the contact record and the agent record, but must also monitor the capability of the agent to handle each different type of multimedia contact at any one time, including consideration of the number of "live" contacts, and being processed, including an average processing time per "live" contact, as well as the number of "non-live" contacts, and being processed, including an average processing time per "non-live" contact. For the purposes of this invention it will be appreciated that "live" contacts generally involve active communication sessions between a customer and a contact center, such as voice calls, video calls, and Instant Messaging, (IM) contacts, whereas "non-live" contacts do not require the customer and the contact center to maintain a communication session, such as email contacts or web forms.

Thus, there is a need for improving the management of customer contacts to thereby provide a more efficient call center service, and reduce the processing burden on the contact center server 30.

SUMMARY

According to an aspect of the present invention there is provided a computer-implemented method of handling contacts at a contact center, the method including the steps of: identifying a characteristic associated with a contact received at the contact center; labeling a contact entity representing the contact with a label identifying the characteristic; responsive to receipt of a request from an agent of the contact center to handle the contact based on the label of the contact entity, assigning the contact to the agent; and responsive to the agent successfully handling the contact, updating an agent record associated with the agent, to indicate a proficiency in handling contacts associated with the characteristic.

Thus, attributes associated with agents are updated and maintained in accordance with activity of the agent within the contact center as opposed to being manually manipulated by a supervisor.

Preferably, the method further comprises storing the contact entity for processing by an agent of the contact center subsequent to the step of labeling the contact entity.

Alternatively or in addition, the method further comprises queuing the contact entity for processing by an agent of the contact center subsequent to the step of labeling the contact entity.

Preferably, the method further comprises the steps of creating a contact record for the contact received at the contact center and updating the contact record with information gleaned from the contact during an initial processing stage.

Preferably, the initial processing stage involves subjecting the contact to at least one of automated response systems and interactive voice response systems.

Preferably, the method further comprises consulting with information stored in the contact record to improve the accuracy of the identified characteristic.

Preferably, the method further comprises routing the contact entity relative to other contact entities at the contact center in order of priority, order of arrival, by skillset, or any other attribute relative to how contacts and agents are matched.

Preferably, the routing of the contact entity comprises queuing the contact entity relative to other contact entities in the system.

Preferably, the method further comprises: identifying a second characteristic associated with the contact, wherein the second characteristic differs from the first characteristic; labeling a second contact entity representing the contact with a label identifying the second characteristic; responsive to receipt of a request from an agent of the contact center to handle the contact based on the label of the second contact entity, assigning the contact to the agent; and responsive to the agent successfully handling the contact, updating an agent record associated with the agent, to indicate a proficiency in handling contacts associated with the second characteristic.

Preferably, the method further comprising generating a first response addressing the first characteristic of the contact, generating a first response addressing the first characteristic of the contact; and collating the first and second responses.

Thus, in a situation where a second characteristic associated with a received contact is identified, two contact entities are created to facilitate the possibility of the two characteristics of the contact being processed by different agents at the same time.

Preferably, the method further comprises storing the second contact entity for processing by an agent of the contact center subsequent to the step of labeling the second contact entity.

Alternatively or in addition, the method further comprises queuing the second contact entity for processing by an agent of the contact center subsequent to the step of labeling the second contact entity.

Preferably, responsive to the contact entity reaching a top of the queue, the method further comprises moving the contact entity to a work pool for review by the agents of the contact center.

Preferably, the method further comprises placing the labeled contact entity in a work pool prior to assigning the contact to the agent.

Preferably, the method further comprises assigning the contact to the agent in accordance with a set or rules defining at least one goal of the contact center.

Preferably, responsive to the agent unsuccessfully handling the contact, the method further comprises updating the agent record to indicate an unsuccessful handling of contacts associated with the characteristic.

Preferably, responsive to the agent unsuccessfully handling the contact, the method further comprises scheduling the agent for training in handling such contacts.

Preferably, responsive to the agent unsuccessfully handling the contact, the method further comprises minimising or revoking permissions for handling contacts associated with the identified characteristic.

Preferably, the method further comprises determining that a contact has been successfully handled including determining that the contact was terminated without the contact being transferred to another agent to handle the same contact for the identified characteristic.

Alternatively or in addition, the method further comprises determining that a contact has been successfully handled including determining that no subsequent contact for the identified characteristic is received from the same customer within a given time period.

Preferably, the method further comprises updating an agent record to indicate that said agent is proficient in handling contacts associated with the identified characteristic when the agent has actually handled a minimum number of such contacts.

Preferably, the method further comprises updating an agent record to indicate that said agent is proficient in handling contacts associated with the identified characteristic when the agent has indicated their satisfaction of the handling of the contact.

Preferably, the method further comprises updating an agent record to indicate that said agent is proficient in handling contacts associated with the identified characteristic when a customer of the contact center has indicated their satisfaction of the handling of the contact.

Preferably, the method further comprises identifying more than one characteristic associated with a contact received at the contact center and labeling a contact entity representing the contact with more than one label, each label identifying one of the more than one characteristics.

Preferably, responsive to an agent handling the contact for fewer than all of the characteristics identified, replacing the contact entity in the work pool.

Preferably, the method further comprising responsive to receipt of a request from a second agent of the contact center to handle the contact based on a second or subsequent label of the contact entity, whilst a first agent is handling the contact based on a first label, assigning the contact to the second agent for processing concurrently with the first agent.

There is also provided a computer program product comprising a computer-readable medium encoding instructions which, when executed in a computerized system, are effective to cause said system to carry out the steps of the aforesaid methods.

There is further provided a system for handling contacts at a contact center, the system comprising: a natural language processing, NLP, engine arranged to identify a characteristic associated with a contact received at the contact center; a contact manager arranged to label a contact entity representing the contact, with a tag identifying the characteristic; an agent manager arranged to assign the contact to an agent in response to a request from the agent to handle the contact based on the label of the contact entity; and the agent manager being further arranged to update an agent record, associated with the agent, to indicate a proficiency of the agent in handling contacts associated with the characteristic.

Preferably, the system further comprises a store for storing the contact entity for the labeled contact entity before the contact entity is assigned to an agent of the contact center.

Alternatively or in addition, the system further comprises a queue for queuing the contact entity for the labeled contact entity before the contact entity is assigned to an agent of the contact center.

Preferably, the NLP engine employs machine-learning algorithms in order to extract details from the contact to identify a characteristic.

Preferably, the NLP engine employs keyword spotting techniques in order to extract details from the contact to identify a characteristic.

Preferably, the identified characteristic comprises at least one of a topic or subject, media type, language requirement, priority, value, tone, and skillset, or any other such attribute relevant to the operation of the CC.

Preferably, the agent record records at least one skillset, or attribute, accredited to the agent and a status of the agent.

Preferably, the agent record maintains a status of the agent for each multimedia type contact the agent is capable of handling.

Preferable, the agent record maintains a permission level associated with the agent for handling contacts associated with different skills.

Preferably, the agent record indicates a proficiency or level of capability in handling contacts related to each skill.

Preferably, the agent record records at least one of a number of contacts having an identified specific characteristic that were handled by the agent, a number of such contacts that were successfully handled and a number of such contacts that were unsuccessfully handled.

The system is preferably implemented in software running on an appropriate computer system or network of computers. The software is typically provided as executable instructions on a machine-readable carrier.

Advantageously, the invention enables the contact center and in particular, the contact center server to self-optimize and adapt itself to facilitate for the dynamic capabilities of agents of the contact center. Furthermore, the invention drastically reduces the workload of the agent manager in configuring the creating and assigning of skillsets to agents.

BRIEF DESCRIPTION OF THE DRAWINGS

In order to show how the invention may be carried into effect, embodiments of the invention are now described below by way of example only and with reference to the accompanying figures in which.

DETAILED DESCRIPTION

Embodiments of the present invention are described below by way of example only. These examples represent the best ways of putting the invention into practice that are currently known to the Applicant although they are not the only ways in which this could be achieved.

Figure 1:
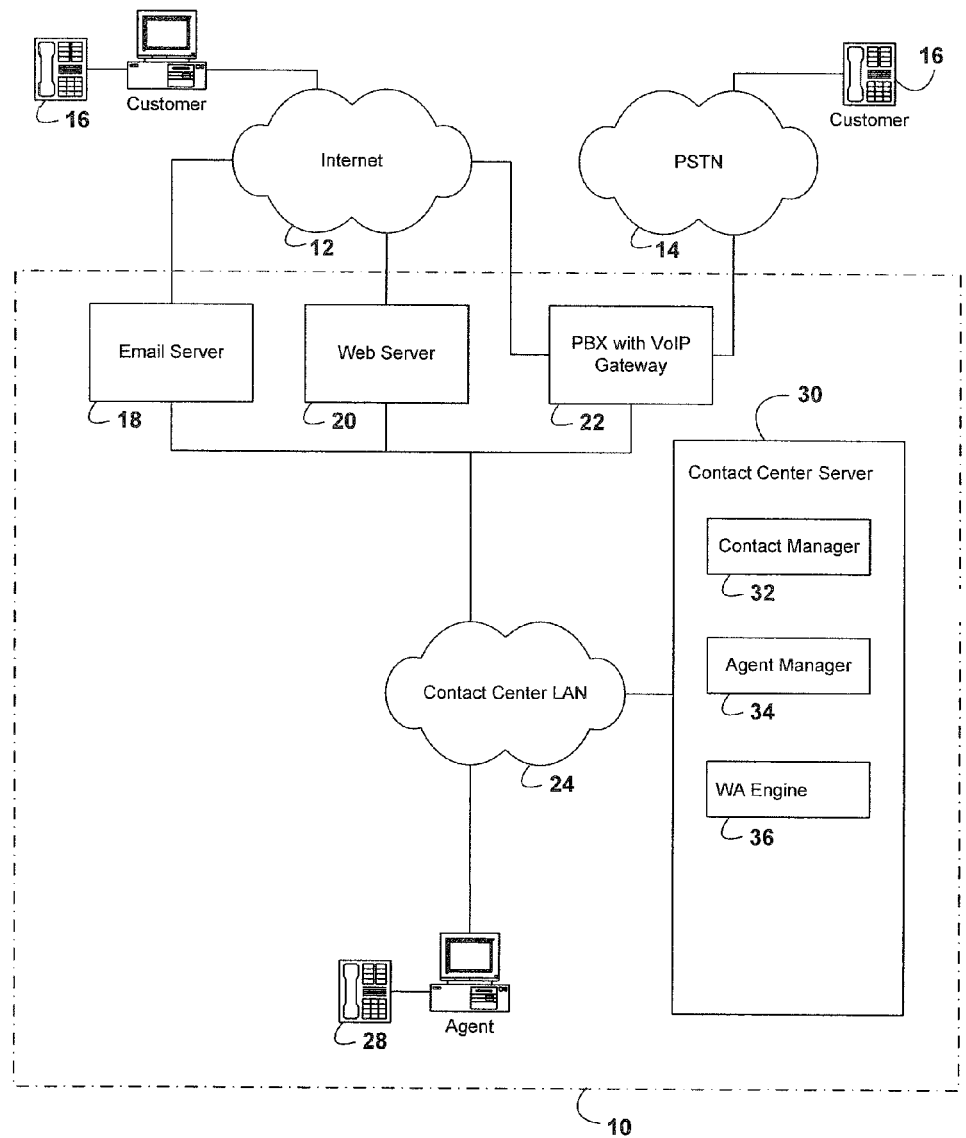
FIG. 1 is a block diagram showing the architecture of a typical contact center and its environment.
Figure 2:
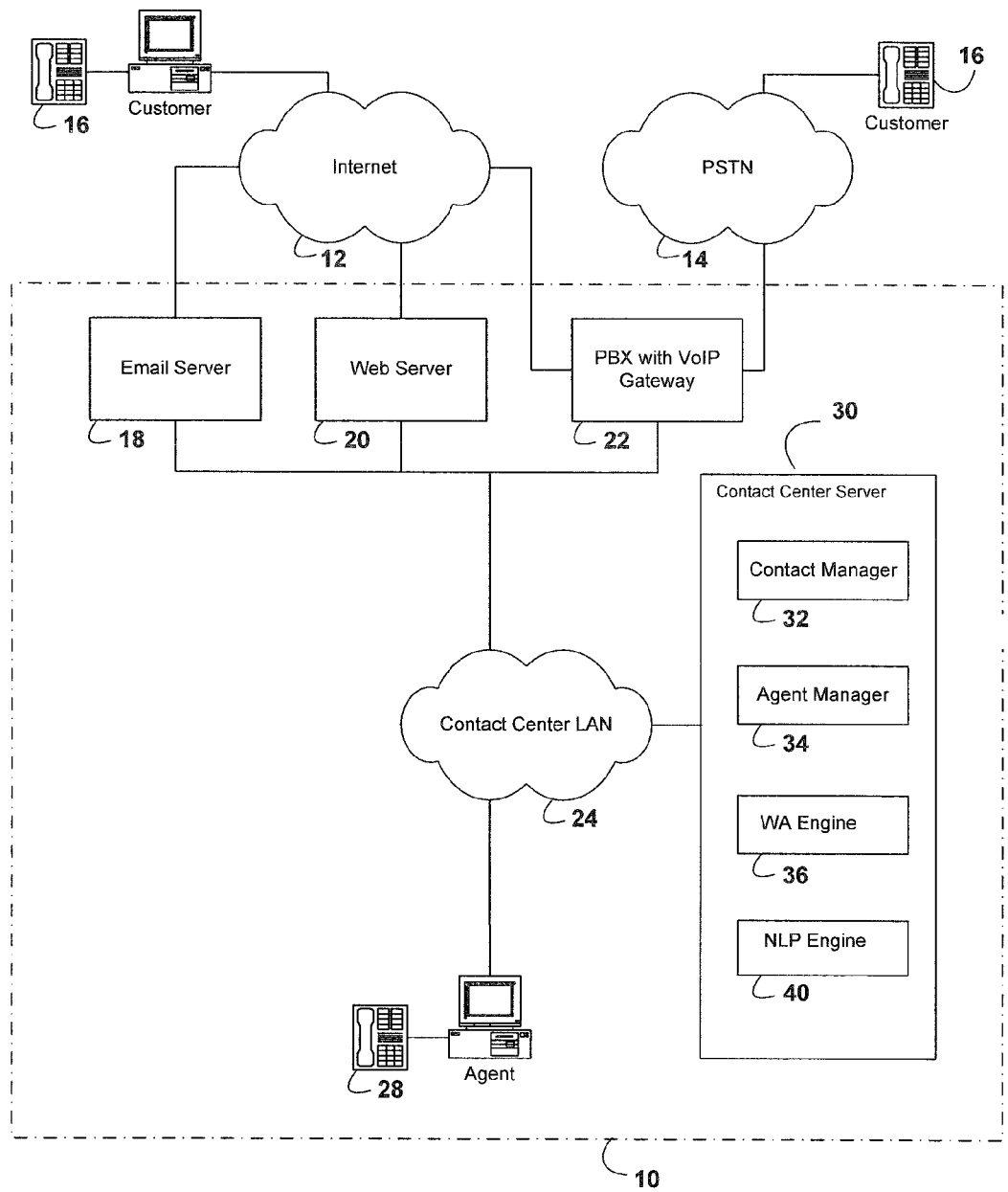
FIG. 2 is a block diagram showing the architecture of a contact center and its environment, according to an embodiment of the invention.

Referring to FIG. 2, there is illustrated, a contact center according to an embodiment of the present invention. In addition to the features of the contact center of FIG. 1, the contact center server 30 of FIG. 2, further comprises a natural language processing (NLP) engine 40. It will be appreciated that the NLP engine may be deployed on a separate server or accessed by the contact center server 30 from a remote location via the Internet or any other suitable means.

The NLP engine 40 employs specialised algorithms in order to extract details from contacts. In particular, the NLP engine 40 is arranged to perform a number of information retrieval, extraction and speech processing techniques, including natural language understanding, relationship extraction, topic segmentation and recognition, word sense disambiguation, and name entity recognition, to name a few.

Figure 3:
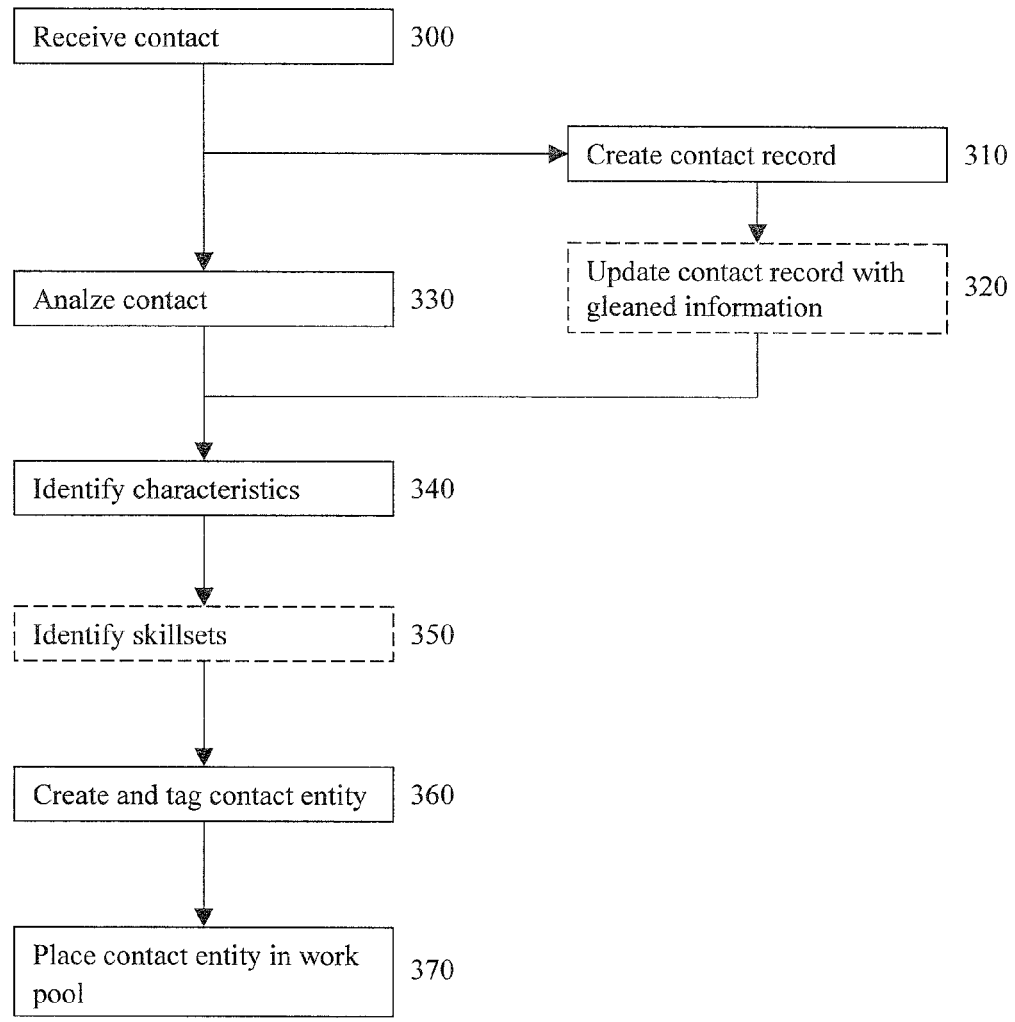
FIG. 3 is a flow diagram depicting the handling of a contact received at the contact center of FIG. 2, according to an embodiment of the invention.

Referring now to FIG. 3, there is illustrated, a flow diagram of the processing of a contact received at the contact center 10. As described above with reference to FIG. 1, and as is also the situation with the contact center of FIG. 2, on receipt 300 of an incoming contact at the contact center 10, the contact center server 30 is arranged to create 310 a contact record for storing information relating to the contact. The contact record is arranged to store details of the received contact such as the time it was received, its source, any customer details which can be deduced based on the source (e.g. the caller line ID or an more general address information such as an email address might be used to reference a customer profile in a database), and the nature of the contact (e.g. customers may have access to a first communication channel for sales or a second communication channel for technical support, etc.).

In one embodiment, the contact record is further arranged to be updated 320 with information gleaned from the contact in its initial stages of processing, for example, from menu choices made in an IVR session. Furthermore, the contact record can be arranged to include customer contact information such as billing information and historical contact information of the customer, for example.

In the embodiment of FIG. 2, the contact center server 30 directs the incoming contact to the NLP engine 40 for processing. The NLP engine 40 is arranged to analyze 330 the contact to identify 340 at least one characteristic of the contact.

For example, if the contact is an email contact, the NLP engine 40 parses the text of the email to identify keywords, which are weighted and analyzed in accordance with a workflow involving probabilistic decisions, to thereby determine at least one characteristic of the contact, such as by recognizing a product name and determining attributes for handling questions relating to the identified product. On the other hand, if the contact is a recorded "call back" message, for example, the NLP engine will apply a speech processing technique to the contact to identify keywords, which are again weighted and analyzed in accordance with a workflow involving probabilistic decisions to determine at least one characteristic of the contact.

In one embodiment, the NLP engine preferably utilizes information available in the contact record when processing the contact, to thereby improve the accuracy of the identification of the contact characteristics. For example, an email contact, subjected to processing by the NLP engine 40, might be determined to most likely require handling by a computer software expert. By utilizing the customer details stored in the contact record, the NLP engine 40 notes that the customer recently bought a software package, and therefore, the probability of the contact requiring handling by a software expert is increased, as is the accuracy of the identified characteristic.

A set of characteristics of a contact, as identified by the NLP engine 40 preferably comprises at least an identified topic or subject, for example, software sales, specific product information, or complaints. However, it will be appreciated that the set of characteristics may comprise any single or combination of identifiable considerations such as media type, language requirement, customer priority, topic, and tone. For example, the NLP engine 40 may determine that an incoming contact is an email, in German, from a high priority customer, (as may be determined from the contact record details), and therefore requiring high priority treatment, about technical troubles in installing a software package, and that the tone of the email is angry. Accordingly, the identified set of characteristic associated with the contact are email, German, high priority, software installation, and angry. Furthermore, the NLP engine 40 may identify a contact as requiring preferential treatment due to the identification of a value characteristic, such as a contact indicating a potential to generate high revenue sales, or a contact indicting an associated risk, such as a potential loss of a customer. This information could be obtained by integrating the contact center and an Enterprise application that has access to more detailed customer records.

In one embodiment, the contact manager 32 labels or tags 360 a contact entity, representing the contact, with data identifying at least one of the identified characteristics, and the contact entities are placed 370 in a work pool for subsequent selection by an agent of the contact center for processing.

In another embodiment, once tagged, the contact entities are placed in queues (not shown) according to a queuing scheme, such as in order of an assigned or determined priority, or in order of arrival at the contact center. When the contact entity reaches a head of the queue, agents 28 consult the tag of the contact entity to determine whether the characteristic indicated thereon identifies a contact which the agent believes he or she is capable of handling, and if so, selects the contact for processing. Alternatively, once the contact entity reaches a head of the queue, it is placed in a work pool for subsequent selection by an agent of the contact center for processing.

In yet another embodiment, the contact manager 32 utilizes the characteristic(s) determined by the NLP engine 40, to identify 350 at least one skillset associated with agents of the contact center, which is most closely representative of the characteristic(s) preferable for handling the contact. Continuing with the above example, a first skillset may be identified as one including German, email and software installation and second skillset may be identified as one including German, email, a capability of handling irate customers, and a third skillset may be identified as one including all of the identified characteristics.

It will be appreciated, however, that the contact manager 32 may identify the characteristic deemed most important to the processing of the contact and which may be the sole or primary skill used to identify at least one suitable skillset. For example, a characteristic of voice call may be identified as the most important, with the prompt placement of the contact in verbal communication with an agent being paramount. In such a situation, all skillsets indicating ability of handling voice communications may be selected for the contact, to thereby minimize a "wait time" associated with the contact.

The contact manager 32 may then label or tag 360 a contact entity, representing the contact, with data identifying the at least one skillset, as opposed to data identifying the at least one identified characteristic, and the contact entities are placed 370 in a work pool for subsequent selection by an agent of the contact center for processing.

In another embodiment, once tagged, the contact entities are placed in queues (not shown) according to a queuing scheme, such as in order of an assigned or determined priority, or in order of arrival at the contact center. When the contact entity reaches a head of the queue, agents 28 consult the tag of the contact entity to determine whether the skillset indicated thereon identifies a contact which the agent believes he or she is capable of handling, and if so, selects the contact for processing. Alternatively, once the contact entity reaches a head of the queue, it is placed 370 in a work pool for subsequent selection by an agent of the contact center for processing.

In yet a further embodiment, contact entities which have been tagged with data identifying at least one of the identified characteristics or at least one skillset, and have been placed in the work pool, are periodically parsed by the work assignment agent to identify and assign a particular contact to a particular agent in order to achieve or meet at least one of a specific goal of the contact center. For example, at a given time, a highly desirable goal of the contact center may be to dramatically increase sales. Thus, the work assignment agent selects as a priority, contacts identified as being sales related and prioritizes the assignment of these contacts to suitable agents. Preferably, the goals of the contact center are defined as a set of rules and the work assignment engine is arranged to operate in accordance with the set of rule. It will be appreciated that the set of rules may be modified in accordance with the requirements of the contact center.

The operation of the contact center whereby agents 28 are permitted to select contacts for processing is herein referred to as "pull" mode. Similarly, it will be appreciated that the operation of a contact center whereby the contact center server 30 directs contacts to be transferred or assigned to agents 28 is herein referred to as "push" mode. Clearly, a contact center may operate in "push" mode and "pull" mode simultaneously. The "pull" mode operation is described in more detail with reference to FIG. 4.

Figure 4:
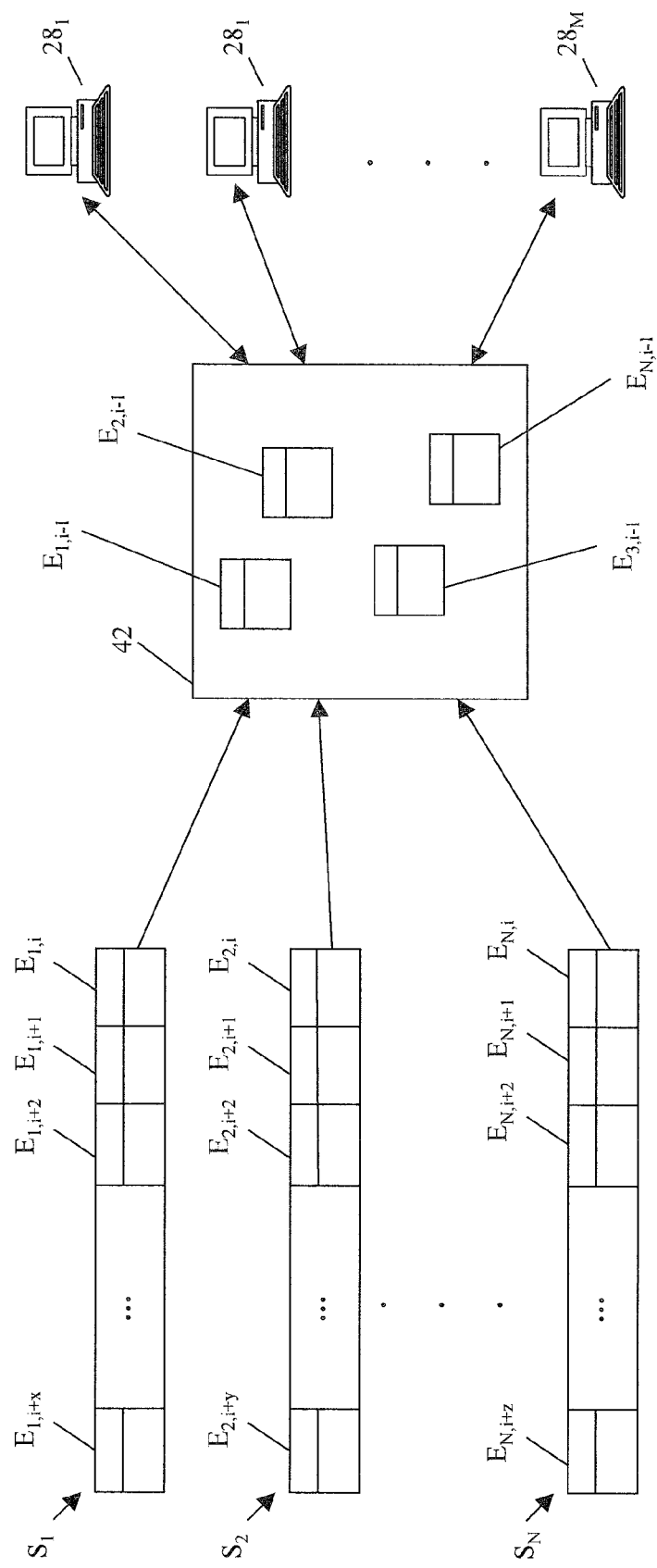
FIG. 4 depicts an embodiment of the invention wherein the contact center of FIG. 2, is operating in "pull" mode.

Referring to FIG. 4, there is illustrated, according to one embodiment, a plurality of skillset queues $S_1, S_2 \ldots S_N$, each capable of receiving a plurality of contact entities $\{E_{1, i}, \ldots E_{1, i+x}\}$, $\{E_{2, i}, \ldots E_{2, i+y}\}, \ldots \{E_{2, i}, \ldots E_{2, i+z}\}$, respectively. Contact entities, $E_{1, i-1}, E_{2, i-1}, \ldots E_{N, i-1}$, from each skillset queue, $S_1, S_2 \ldots S_N$, which have reached the top of the skillset queues, are removed and placed in a work pool 42, from where an agent $28_1, 28_2 \ldots 28_M$, is permitted to select or "pull" the contact for handling.

A work assignment engine 36 monitors and maintains the skillset queues, updating and reordering items as contacts entities are added and removed for placement in the work pool 42. It will be appreciated that the number and nature of different skillsets, including a number of contact entities each skillset queue is capable of accepting, the number of agents 28 and the number of contact entities in the work pool 42 is selected by the designers of the contact center 10 and is of little importance to the understanding of this invention.

However, and as previously discussed, it will be appreciated that in other embodiments, the contact entities may be queued according to a different queuing scheme, or may be placed directly in directly into the work pool 42, in which case an agent can select any contact since none of the contacts will be held in a queue prior to being placed in the work pool 42.

Contact center agents 28 are typically associated with particular skills or attributes enabling them to service contacts including queries relating to those skills or attributes. Thus, in one embodiment of the invention, the agent manager 34 maintains, for each agent 28 of the contact center 10, an agent record which includes skills or attributes accredited to the agent.

In the embodiment where the contact entities progress through skillset queues prior to being placed in the work pool 42, the agent manager 34 maintains, for each agent 28 of the contact center 10, an agent record which includes groups of skills or skillsets accredited to the agent, and which correspond to the skillsets of the skillset queues of the contact center.

Preferably, the agent record further indicates a status of the agent, such as "unavailable", "logged out", "busy", "away from desk" etc, in the known manner. It will be further appreciated that the agent record may indicate a different status for different media type. For example, an agent record may indicate that the agent 28 is "available" for "non-live" communications, such as email, but "busy" for "live" contacts such as voice calls or IMs, is fluent in English and German, is capable of handling enquiries relating to software package sales and software installation problems, and has experience in successfully handling contacts from irate customers.

In one embodiment, an agent 28 is arranged to select from the work pool 42, a contact for processing, based on data stored in the contact entity. As reflected in the agent's record, the agent may be proficient in dealing with contacts having the characteristic or skill requirements or attributes indicated in the data. Alternatively, the agent may not be recognized as being proficient, or indeed as having any experience in handling contacts requiring such characteristics or skillsets, but may wish to be accredited with the skills or attributes required to handle the contact.

On selection of a contact entity from the work pool 42 by an agent, the contact manager 32 assigns the associated contact to the agent 28 for processing. If the agent 28 is successful in handling the contact, the contact is terminated and the agent manager 34 updates the agent record to reflect the success, thereby maintaining a record of the agent's abilities and progression.

In the case that the skills or attributes required for handling the contact that were not previously associated with the agent 28, the agent manager 34 will update the agent record to accredit the agent 28 with those skills or attributes.

Furthermore, it will be appreciated that if an agent 28 under performs when handling a contact in relation to a skill or skillset or attribute for which they have been accredited, they may be scheduled for training in that skill in order to improve their handling of such contacts, and may, in the meantime, have their permission for handling contacts requiring such a skill or skillset or attribute revoked, as would be indicated in their agent record.

In one embodiment, it will be appreciated that the agent's freedom to select a contact entity from the work pool 42 will be dependent on a permission being awarded to the agent. For example, a newly qualified agent may be limited to selecting certain types of contacts for an introductory period, and for example, may be prevented from handling high priority contacts, or those identified as being irate customers.

It will be further appreciated that the agent manger 34 may record a level of success of the agent's handling of a contact, for example, by recording in the agents record ability levels such as, expert, satisfactory, competent, incompetent, etc. An agent's ability level for a skillset may be upgraded depending on a number of successful contacts handled, or a number of successful contacts handled within a given time frame, for example.

In one embodiment, the selection by an agent of a contact tagged with a given characteristic or skillset, is sufficient to cause the agent manager to update the agent's record to indicate an ability to handle such contacts. In a second embodiment, the selection by an agent of a contact, in addition to the termination of the contact without the contact being transferred to another agent to handle the same contact for that characteristic or skillset, is required for the agent manager to update the agent's record to indicate an ability to handle such contacts. In a third embodiment, the selection by an agent of a contact, in addition to no subsequent contact from the customer for the that characteristic or skillset within a given time period, is required for the agent manager to update the agent's record to indicate an ability to handle such contacts. In a fourth embodiment, the agent manager may only indicate an agent's ability to handle contacts of a given characteristic or skillset or attribute, when the agent has indicated their satisfaction of the handling of the contact. In a fourth embodiment, the agent manager may only indicate an agent's ability to handle contacts of a given characteristic or skillset or attribute, when a customer has indicated their satisfaction of the handling of the contact, by means of a survey, for example. Alternatively, or in addition, the agent manager may only indicate an agent's ability to handle contacts of a given characteristic or skillset, when the agent has actually handled a minimum number of such contacts.

In one embodiment, it will be appreciated that a given contact entity in the work pool 42 may include data identifying multiple tags for at least some of the identified characteristics or skillsets required to handle the contact. In such an embodiment, an agent may select the contact entity with the intention of satisfying one or more, but potentially not all of, the requirements of the contact. In such a case, if the agent is successful in handling the contact for a specific skill or skillset, the agent manager will update the agent's record to reflect the successful handling of the contact for the skill(s) or skillset(s) by the agent. Thereafter, if the contact still requires further processing, due to the inability, failure or lack of attempt of the agent to handle the requirements of the contact entirely, the contact is returned to the work pool 42 or skillset queue, as deemed appropriate by the contact center server 30.

It will be further appreciated that a single contact can be handled by more than one agent concurrently. In such an embodiment, an agent notifies the agent manager 34 of the characteristic(s) or skillset(s) of the tagged contact entity for which they intend to process the contact, and the contact is assigned to that agent. Nonetheless, the contact entity may remain in the work pool 42 and a status of the tagged characteristic(s) or skillset(s) in the data of the contact entity may be flagged as "being processed", or "completed", or any other suitable status indicator. Thus, another agent may "pull" the contact in order to handle requirements of the characteristic (s) or skillset(s) not being handled by an agent. In this way, contact handling of the contact center is expedited.

In an alternative embodiment, the contact manager 32 may create multiple contact entities for each contact, wherein each contact entity is tagged with one characteristic or skillset. Thus, in the case that a contact includes two separate requests, one relating to sales information, and a second relating to account queries, the contact manager 32 creates two separate contact entities the first tagged with "sales", and the second tagged with "accounts". Each of these queries can be handled by different agents, as appropriate, and the results collated before a response is sent to the customer.

It will be appreciated that by permitting agents of the contact center 10 to select contacts for handling based on the tagged information, and having the agent manager 34 update the agent records to reflect the progress of the agent, the contact center effectively operates in a self-optimizing manner. When the contact center is operating in the push-mode, waiting contacts with attributes that match available agents with those attributes will be delivered to those agents. The contact center may operate in both "push" and "pull" modes concurrently, whereby for example, contacts are pushed to agents during busy periods, and when agents are idle, they are permitted to view pending contacts, and select contacts for processing based on identified characteristics or skills, to thereby improve their performance in handling such contacts, or obtain new skills.

In a further aspect of the invention, the contact manager 32 of the contact center server 30 of FIG. 2, is arranged to monitor discussion forums or social media or social network applications, for example, Twitter feeds, or "Tweets". In this way, topical discussions involving or relating to business associated with the contact center can be monitored, and agents can respond to queries or statements, or intervene in discussions of the forum. This aspect of the invention is particularly beneficial in correcting untruths about the business, or assisting potential customers.

In one embodiment, the contact manager 32 is preferably arranged to identify discussions of interest to the contact center as defined in a rule database (not shown). For example, the rules database may indicate a set of words, which if identified as appearing in a message or discussion, causes the contact center server 30 to execute a workflow for processing the message.

Once the contact manager 32 identifies a message of interest, the workflow directs the message to the NLP engine 40, for processing, and to thereby identify characteristics or skillsets required for handling the message. As with the embodiments of the first aspect of the invention, a contact entity is created for the message, is labeled with information indicating the identified characteristics or skillsets for processing by an agent 28 of the contact center 10.

The invention is not limited to the embodiment(s) described herein but can be amended or modified without departing from the scope of the present invention.

What is claimed is:

1. A computer-implemented method of handling contacts at a contact center, the method being operable in a contact center system, the method including the steps of:
   a) directing a contact received at the contact center to a natural language processing (NLP) engine for processing in order to identify at least one characteristic of the contact;
   b) identifying by the NLP engine keywords associated with the contact which are weighted and analyzed in accordance with a workflow;
   c) utilizing information available in a previously stored contact record associated with the contact during processing by the NLP engine to improve the accuracy of the identification of the at least one characteristic;
   d) labeling a contact entity representing the contact with a label identifying the characteristic;
   e) utilizing the at least one characteristics determined by the NLP engine to identify at least one skillset associated with agents of the contact center which is mostly closely representative of the characteristic;
   f) assigning the contact to the agent having a skillset most closely representative of the characteristic; and
   g) responsive to the agent successfully handling the contact, updating by a processor of the contact center system, an agent record associated with the agent, to indicate a proficiency in handling contacts associated with the characteristic.

2. The method of claim 1 further comprising the step of storing the contact entity for processing by an agent of the contact center subsequent to the step of labeling the contact entity.

3. The method of claim 1 further comprising the step of queuing the contact entity for processing by an agent of the contact center subsequent to the step of labeling the contact entity.

4. The method of claim 1 further comprising the steps of creating a contact record for the contact received at the contact center and updating the contact record with information gleaned from the contact during an initial processing stage.

5. The method of claim 4 wherein the initial processing stage involves subjecting the contact to at least one of automated response systems and interactive voice response systems.

6. The method of claim 4 wherein the initial processing stage involves analyzing the contact by parsing text included therein to identify the information.

7. The method of claim 4 further comprising consulting with information stored in the contact record to improve the accuracy of the identified characteristic.

8. The method of claim 1 further comprising routing the contact entity relative to other contact entities in the queue in order of priority, order of arrival, by skillset or any other attribute relative to how contacts and agents are matched.

9. The method of claim 8 wherein the step of routing of the contact entity comprises queuing the contact entity relative to other contact entities in the system.

10. The method of claim 1 further comprising:
   a) identifying a second characteristic associated with the contact, wherein the second characteristic differs from the first characteristic;
   b) labeling a second contact entity representing the contact with a label identifying the second characteristic;
   c) responsive to receipt of a request from an agent of the contact center to handle the contact based on the label of the second contact entity, assigning the contact to the agent; and
   d) responsive to the agent successfully handling the contact, updating an agent record associated with the agent, to indicate a proficiency in handling contacts associated with the second characteristic.

11. The method of claim 10 further comprising generating a first response addressing the first characteristic of the contact, generating a second response addressing the second characteristic of the contact; and collating the first and second responses.

12. The method of claim 10 further comprising storing the second contact entity for processing by an agent of the contact center subsequent to the step of labeling the second contact entity.

13. The method of claim 10 further comprising queuing the second contact entity for processing by an agent of the contact center subsequent to the step of labeling the second contact entity.

14. The method of claim 1 further comprising moving the contact entity to a work pool for review by the agents of the contact center in response the contact entity reaching a top of the queue.

15. The method of claim 1 further comprising placing the labeled contact entity in a work pool prior to assigning the contact to the agent.

16. The method of claim 15 further comprising assigning the contact to the agent in accordance with a set of rules defining at least one goal of the contact center.

17. The method of claim 1 further comprising updating the agent record to indicate an unsuccessful handling of contacts associated with the characteristic in response to the agent unsuccessfully handling the contact.

18. The method of claim 17 further comprising scheduling the agent for training in handling such contacts, in response to the agent unsuccessfully handling the contact.

19. The method of claim 17 further comprising minimizing or revoking permissions for handling contacts associated with the identified characteristic, in response to the agent unsuccessfully handling the contact.

20. The method of claim 1 further comprising determining that a contact has been successfully handled including determining that the contact was terminated without the contact being transferred to another agent to handle the same contact for the identified characteristic.

21. The method of claim 1 further comprising determining that a contact has been successfully handled including determining that no subsequent contact for the identified characteristic is received from the same customer within a given time period.

22. The method of claim 1 further comprising updating an agent record to indicate that said agent is proficient in handling contacts associated with the identified characteristic when the agent has indicated their satisfaction of the handling of the contact.

23. The method of claim 1 further comprising updating an agent record to indicate that said agent is proficient in handling contacts associated with the identified characteristic when a customer of the contact center has indicated their satisfaction of the handling of the contact.

24. The method of claim 1 further comprising updating an agent record to indicate that said agent is proficient in handling contacts associated with the identified characteristic when the agent has actually handled a minimum number of such contacts.

25. The method of claim 1 further comprising identifying more than one characteristic associated with a contact received at the contact center and labeling a contact entity representing the contact with more than one label, each label identifying one of the more than one characteristics.

26. The method of claim 1 further comprising placing the contact entity in the work pool, in response to an agent handling the contact for fewer than all of the characteristics identified.

27. The method of claim 1 further comprising assigning the contact to a second agent of the contact center for processing concurrently with the agent, in response to receipt of a request from the second agent to handle the contact based on a second or subsequent label of the contact entity, whilst said agent is handling the contact based on a first label.

28. A computer program product comprising a non-transient computer-readable medium encoding instructions which, when executed in a computerized system, are effective to cause said system to carrying out the steps of:
   a) directing a contact received at the contact center to a natural language processing (NLP) engine for processing in order to identify at least one characteristic of the contact;
   b) identifying by the NLP engine keywords associated with a contact received at the contact center which are weighted and analyzed in accordance with a workflow;
   c) utilizing information available in a previously stored contact record associated with the contact during processing by the NLP engine to improve the accuracy of the identification of the at least one characteristic;
   d) labeling a contact entity representing the contact with a label identifying the characteristic;
   e) utilizing the at least one characteristics determined by the NLP engine to identify at least one skillset associated with agents of the contact center which is mostly closely representative of the characteristic;
   f) assigning the contact to the agent having a skillset mostly closely representative of the characteristic; and
   g) responsive to the agent successfully handling the contact, updating by a processor of the system, an agent record associated with the agent, to indicate a proficiency in handling contacts associated with the characteristic.

* * * * *